United States Patent
Oh et al.

(10) Patent No.: US 8,638,730 B2
(45) Date of Patent: Jan. 28, 2014

(54) APPARATUS AND METHOD FOR PERSISTENT ALLOCATION IN A WIRELESS COMMUNICATION SYSTEM

(75) Inventors: Chang-Yoon Oh, Yongin-si (KR); Won-Il Roh, Yongin-si (KR); Geun-Hwi Lim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 655 days.

(21) Appl. No.: 12/395,375

(22) Filed: Feb. 27, 2009

(65) Prior Publication Data

US 2009/0219878 A1  Sep. 3, 2009

(30) Foreign Application Priority Data

| Feb. 29, 2008 | (KR) | .......................... 10-2008-0018692 |
| Apr. 24, 2008 | (KR) | .......................... 10-2008-0038364 |
| May 2, 2008 | (KR) | .......................... 10-2008-0041123 |

(51) Int. Cl.
*H04W 4/00* (2009.01)
*G08C 25/02* (2006.01)

(52) U.S. Cl.
USPC .......................................... 370/329; 714/748

(58) Field of Classification Search
USPC .......... 370/208, 310, 329, 330; 455/450, 451, 455/452.1, 456.5, 456.6, 464, 509, 522, 455/571, 127.1
See application file for complete search history.

(56) References Cited

U.S. PATENT DOCUMENTS

| 2005/0201269 | A1* | 9/2005 | Shim et al. ..................... 370/208 |
| 2006/0153112 | A1* | 7/2006 | Lim et al. ...................... 370/310 |
| 2006/0239264 | A1 | 10/2006 | Kang et al. |
| 2007/0286066 | A1* | 12/2007 | Zhang et al. ................... 370/208 |
| 2008/0019312 | A1 | 1/2008 | Venkatachalam |
| 2009/0070650 | A1* | 3/2009 | Bourlas et al. ................. 714/748 |
| 2009/0097426 | A1* | 4/2009 | Yin ............................... 370/311 |
| 2009/0109931 | A1* | 4/2009 | Yin ............................... 370/335 |

FOREIGN PATENT DOCUMENTS

| CN | 101103600 A | 1/2008 |
| WO | 2006-075870 A1 | 7/2006 |

OTHER PUBLICATIONS

"IEEE 802.16 Broadbad Wireless Access Working Group: Persistent Allocation" Date Jan. 18, 2008. Sources, Jianmin Lu, Sean McBeath, Philip Barber, Yair Bourlas, Mo-Han Fong, John Humber, Vladimir Yanover, Anuj Puri. Document: IEEE C802.16maint-08/056r3. http://www.ieee802.org/16/maint/contrib/C80216maint-08_056r3.doc.*

June Moon, Hoon Chang, Kwanhee Ro, Seho Kim, Jaehee Cho, Heewon Kang, Changyoon Oh, "Persistent allocation method for reducing MAP overhead", IEEE 802.16 Broadband Wireless Access Working Group, Jan. 14, 2008.

Suresh Kalyanasundaram, Anand Bedekar, Steven Xu, Hua Xu, "Persistent Allocation Signaling Messages", IEEE 802.16 Presentation Submission Template, Jan. 14, 2008.

* cited by examiner

*Primary Examiner* — Afshawn Towfighi
(74) *Attorney, Agent, or Firm* — Jefferson IP Law, LLP

(57) ABSTRACT

An apparatus and method for persistent allocation in a wireless communication system are provided. An operation method of a Base Station (BS) includes determining if decoding information for one or more persistent allocations assigned to one or more corresponding Mobile Stations (MSs) is updated, if the decoding information is updated, generating a signaling message to signal the update of the decoding information, and transmitting the signaling message through a DL MAP. The signaling message includes an R_CID and ACID associated with at least one persistent allocation to which the updated decoding information is to be applied.

26 Claims, 10 Drawing Sheets

[QPSK]

[16QAM]

US 8,638,730 B2

APPARATUS AND METHOD FOR PERSISTENT ALLOCATION IN A WIRELESS COMMUNICATION SYSTEM

PRIORITY

This application claims the benefit under 35 U.S.C. §119(a) of a Korean patent application filed in the Korean Intellectual Property Office on Feb. 29, 2008 and assigned Serial No. 10-2008-0018692, a Korean patent application filed in the Korean Intellectual Property Office on Apr. 24, 2008 and assigned Serial No. 10-2008-0038364, and a Korean patent application filed in the Korean Intellectual Property Office on May 2, 2008 and assigned Serial No. 10-2008-0041123, the entire disclosures of each of which are hereby incorporated by reference.

BACKGROUND OF THE INVENTION

1. Field of the Invention

The present invention relates to an apparatus and method for persistent allocation in a wireless communication system. More particularly, the present invention relates to an apparatus and method for informing a Mobile Station (MS), which is allocated resources by persistent allocation, of changed decoding information.

2. Description of the Related Art

Many wireless communication technologies have been proposed as candidates for high speed mobile communication. Among them, the Orthogonal Frequency Division Multiplexing (OFDM) technique is presently recognized as the preferred next-generation wireless communication technology. In the future, it is expected that the OFDM technology will be used in most wireless communication technologies. At present, the OFDM technology is adopted as the standard in the Institute of Electrical and Electronics Engineers (IEEE) 802.16 Wireless Metropolitan Area Network (WMAN), which is considered a 3.5-Generation (3.5G) technology.

An IEEE 802.16 based system transmits a MAP message (i.e., a DownLink/UpLink (DL/UL) MAP message) including resource allocation information every frame. The resource allocation information is valid only at a corresponding frame. In general, a Voice over Internet Protocol (VoIP) service has a feature of transmitting a small sized packet by periods. Because a system has to support many VoIP users, a conventional method of performing resource allocation every frame is inefficient. Thus, in recent years, a persistent allocation scheme (i.e., a fixed allocation scheme) is being considered in which resources, once allocated, are valid periodically.

The persistent allocation scheme can reduce a signaling overhead that is generated by transmitting resource allocation information (or a resource allocation message) to a Mobile Station (MS) every frame. That is, a Base Station (BS) persistently allocates specific resources to the MS that provide a service of periodically generating traffic. Then, the MS can persistently use the resources allocated through the persistent allocation scheme until the resource is released. Accordingly, the BS does not have to transmit the resource allocation information for the MS every frame.

As described above, the persistent allocation scheme does not transmit additional signaling after transmitting signaling for the initial resource allocation. Thus, if there is a change of decoding information (e.g., a Modulation and Coding Scheme (MCS) level, power boosting information, etc.) for a burst periodically allocated according to the persistent allocation scheme, a BS has no way to inform an MS of the change. In one example, the BS can again transmit signaling for initial resource allocation (i.e., a persistent allocation message) to inform of changed information. However, transmitting the persistent allocation message every time to inform all MSs, which are allocated resources by the persistent allocation scheme, of changed decoding information as described above can result in a signaling overhead. Thus, there is a need for a technique to efficiently transmit changed decoding information to an MS that is allocated resources by a persistent allocation scheme.

SUMMARY OF THE INVENTION

An aspect of the present invention is to address at least the above-mentioned problems and/or disadvantages and to provide at least the advantages described below. Accordingly, an aspect of the present invention is to provide an apparatus and method for reducing a signaling overhead associated with a persistent allocation in a wireless communication system.

Another aspect of the present invention is to provide an apparatus and method for efficiently transmitting changed decoding information to a Mobile Station (MS) that is allocated resources by persistent allocation in a wireless communication system.

A further aspect of the present invention is to provide an apparatus and method for signaling the update of power boosting information for persistent allocations assigned to MSs by persistent allocation in a wireless communication system.

Yet another aspect of the present invention is to provide an apparatus and method for gathering and signaling decoding information for all MSs that are allocated resources by persistent allocation in a wireless communication system.

The above aspects are addressed by providing an apparatus and method for persistent allocation in a wireless communication system.

In accordance with an aspect of the present invention, an operation method of a Base Station (BS) in a wireless communication system is provided. The method includes determining if decoding information for one or more persistent allocations assigned to one or more corresponding Mobile Stations (MSs) is updated, if the decoding information is updated, generating a signaling message to signal the update of the decoding information, and transmitting the signaling message through a DownLink (DL) MAP. The signaling message includes a Reduced Connection IDentifier (R_CID) and Hybrid Automatic Repeat reQuest (HARQ) Channel ID (ACID) associated with at least one persistent allocation to which the updated decoding information is to be applied.

In accordance with another aspect of the present invention, an operation method of an MS in a wireless communication system is provided. The method includes receiving a signaling message to signal an update of decoding information for one or more DL persistent allocations, determining if the updated decoding information for the MS is included within the signaling message and, if the updated decoding information is included within the signaling message, updating the decoding information for the one or more persistent allocations. The signaling message includes an R_CID and ACID associated with at least one persistent allocation to which the updated decoding information is to be applied.

In accordance with a further aspect of the present invention, a BS apparatus in a wireless communication system is provided. The apparatus includes a controller, a message generator, and a transmitter. The controller updates decoding information for one or more persistent allocations assigned to one or more corresponding MSs. The message generator generates a signaling message to signal the update of the decoding information. The transmitter transmits the signaling message through a DL MAP. The signaling message includes an R_CID and ACID associated with at least one persistent allocation to which the updated decoding information is to be applied.

In accordance with yet another aspect of the present invention, an MS apparatus in a wireless communication system is provided. The apparatus includes a receiver, a message analyzer, and a controller. The receiver receives a signaling message to signal an update of decoding information for one or more DL persistent allocations. The message analyzer determines if the updated decoding information for an MS is included within the signaling message, and extracts the updated decoding information from the signaling message. The controller updates the decoding information for the one or more persistent allocations using the extracted updated decoding information. The signaling message includes an R_CID and ACID associated with at least one persistent allocation to which the updated decoding information is to be applied.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

Figure 1:
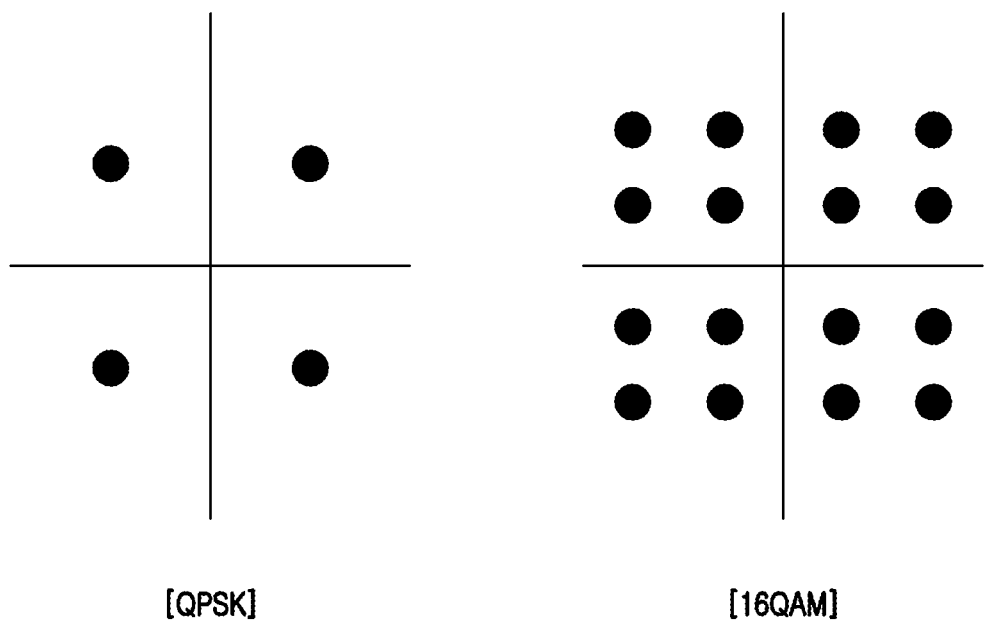
FIG. 1 is a diagram illustrating constellations for a Quadrature Phase Shift Keying (QPSK) signal and a 16-Quadrature Amplitude Modulation (16QAM) signal.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A scheme for signaling the update of decoding information for persistent allocations assigned to MSs by persistent allocation in a wireless communication system according to exemplary embodiments of the present invention is described below. The decoding information may be, for example, power boosting information, a Modulation and Coding Scheme (MCS) level, a burst size, a burst position, etc.

The following description is made in the context of a broadband wireless communication system based on Orthogonal Frequency Division Multiplexing/Orthogonal Frequency Division Multiple Access (OFDM/OFDMA). However, it is to be understood that this is merely for the sake of the convenience and that the present invention is not limited to an OFDM/OFDMA-based system. Thus, it should be clearly understood that the present invention is also applicable to any other wireless communication system using a persistent allocation scheme.

In general, if there is a change of a channel environment between a Base Station (BS) and an MS, it requires link adaptation. The link adaptation method may be divided into two parts. The first part is to change an MCS level and the second part is to control a transmit power. After DownLink (DL) resources are allocated by persistent allocation, if there is a change of an MCS level, it requires resource reallocation in any form. This is because, since the change of the MCS level leads to a change of a size of a resource, it is required to again inform of the changed resource.

The power control method, a method of changing a transmit power value without changing an MCS level can reduce an overhead that is generated by reallocating resources. In particular, if a modulation scheme is Quadrature Amplitude Modulation (QAM), an MS is informed of a changed transmit power value so that the MS can decode a corresponding burst correctly.

A description is made below of an example, when there is a change of a transmit power value (or power boosting value) of a burst allocated by persistent allocation, of signaling for informing an MS of the changed transmit power.

FIG. 1 is a diagram illustrating constellations for a QPSK signal and a 16QAM signal.

As illustrated in FIG. 1, in a QPSK signal constellation, there is only one signal point at each quadrant and thus, a signal point can be detected based on only a phase. In contrast, in a 16QAM signal constellation, there are four signal points at each quadrant and thus, detecting a signal point requires the knowledge of both a magnitude and a phase.

For example, if a BS allocates DL resources to an MS by persistent allocation, the BS initially transmits resource allocation information according to the persistent allocation to the MS. The resource allocation information includes modulation scheme information to be used for a DL burst transmitted by periods. Here, the assumption is to use 16QAM as a modulation scheme. However, because QAM has to detect a signal point using a magnitude as well as a phase, if there is a change of a power boosting value of a corresponding burst due to a channel change, the BS has to provide the changed power boosting value to the MS.

Figure 2:
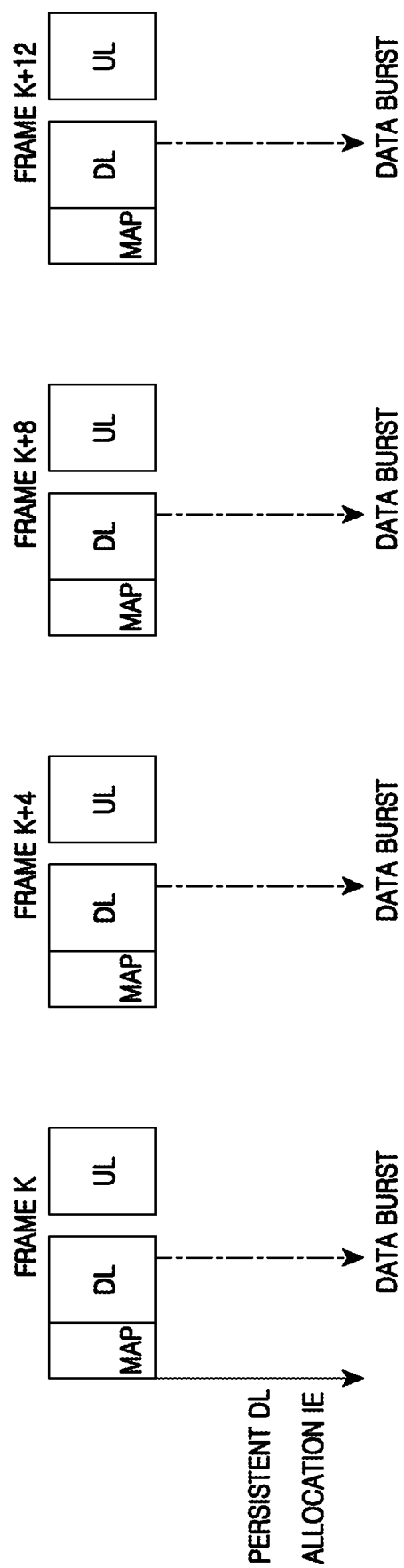
FIG. 2 is a diagram describing a persistent allocation scheme according to an exemplary embodiment of the present invention.

FIG. 2 is a diagram for describing a persistent allocation scheme according to an exemplary embodiment of the present invention.

As illustrated in FIG. 2, a BS sends a persistent allocation message (i.e., a persistent allocation Information Element (IE)) in a frame at which persistent allocation begins, and transmits a DL data burst to a corresponding MS through allocated persistent resources at a predefined period. FIG. 2 illustrates that DL persistent resources are allocated at a 4-frame period. The MS receives the persistent allocation message at a frame (k) and, through the persistent allocation message, acquires a period of allocation of persistent resources and a position and size of resources within the frame, etc. If the allocation period is equal to 4 frames, the MS receives a DL burst through persistent resources at a frame (k), a frame (k+4), a frame (k+8), and a frame (k+12).

If there is a change of a channel state in transmitting a burst using resources allocated by persistent allocation, the BS can change a transmit power value (i.e., a power boosting value) of the burst. If there is a change of the power boosting (meaning an inclusion of boosting and deboosting) value, the BS transmits the changed power boosting value to the MS.

A power boosting IE defines a signaling message used to transmit the power boosting value. For example, the power boosting IE can include a power boosting value and a User IDentifier (UID) of an MS to which the power boosting value is to be applied. In one example, the UID can be a Connection IDentifier (CID) of an MS or can be a sub-IDentifier (subID) that is able to reduce an overhead. In another example, the UID may be an index of a control channel (e.g., a fast feedback channel) allocated to an MS. The control channel can be, for example, a Channel Quality Indicator CHannel (CQICH), an ACKnowledgement CHannel (ACKCH), etc.

A description of recording a UID in a power boosting IE is made below.

Table 1 shows an example of a power boosting IE according to an exemplary embodiment of the present invention.

TABLE 1

| Syntax | Size(bit) | Notes |
|---|---|---|
| Power boosting IE{ | | |
| Extended 2 Downlink Interval Usage Code (DIUC) | 4 | |
| Length | 8 | |
| # of CID | | |
| For (i=1; i <= # of CID; i++){ | | |
| CID | | |
| Power boosting field | | Power boosting value |
| } | | |
| } | | |

Table 1 shows that a CID of an MS is used as a UID. That is, the power boosting IE includes a number of MSs (i.e., a connection count (# of CID)) having a change of a power boosting value, and a CID and corresponding power boosting value (i.e., power boosting field) for each MS.

Table 2 shows another example of a power boosting IE according to an exemplary embodiment of the present invention.

TABLE 2

| Syntax | Size(bit) | Notes |
|---|---|---|
| Power boosting IE{ | | |
| Extended 2 DIUC | 4 | |
| Length | 8 | |
| # of CID | | |
| For (i=1; i <= # of CID; i++){ | | |
| CID | | |
| ACID | | Start of ACID |
| Power boosting field | | Power boosting value |
| } | | |
| } | | |

As shown in Table 2, the power boosting IE can include a number of MSs (i.e., a connection count (# of CID)) having a change of a power boosting value, and a CID, ACID, and corresponding power boosting value (i.e., power boosting field) for each MS. The ACID is a Hybrid Automatic Repeat reQuest (HARQ) Channel IDentifier used for managing an initial transmission and retransmission. If two or more persistent resources are allocated to an MS, the persistent resources are operated with different ACIDs. Accordingly, the MS can distinguish if corresponding decoding information (e.g., a power boosting value) corresponds to any persistent resource, using the ACID.

The CID (e.g., 16 bits) of the MS can be replaced with a Reduced CID (R_CID) or subID (e.g., 4 bits), thereby reducing an overhead. Table 3 shows another example of a power boosting IE using the R_CID.

TABLE 3

| Syntax | Size | Notes |
|---|---|---|
| Power boosting IE{ | | |
| Extended-2 DIUC | 4 | |
| Length | 8 | |
| R_CID Type | 2 | 0b00: Normal CID |
| | | 0b01: RCID11 |
| | | 0b10: RCID7 |
| | | 0b11: RCID3 |
| # of R_CID | 4 | |
| For (i=1; i <= # of R_CID; i++){ | | |
| R_CID | Variable | |
| A_CID | 4 | Start of ACID |

TABLE 3-continued

| Syntax | Size | Notes |
| --- | --- | --- |
| boosting | 3 | 0b000: Normal (not boosting) |
| | | 0b001: +6 dB |
| | | 0b010: −6 dB |
| | | 0b011: +9 dB |
| | | 0b100: +3 dB |
| | | 0b101: −3 dB |
| | | 0b110: −9 dB |
| | | 0b111: −12 dB |
| } | | |
| } | | |

The R_CID of Table 3 is a scheme defined in the Institute of Electrical and Electronics Engineers (IEEE) 802.16 standard to reduce a CID overhead. If the 'R_CID Type' is designated as 'RCID11', only 11 Least Significant Bits (LSBs) of a CID are used. Similarly, if the 'R_CID Type' is designated as 'RCID7', only 7 LSBs of the CID are used. The assumption is that a BS allocates two different persistent resources to an MS. When persistent resources are allocated, one or more ACIDs are allocated for each persistent resource. The ACID is a HARQ Channel IDentifier used for managing initial transmission and retransmission for HARQ. The two allocated persistent resources are operated with different ACIDs. If a power boosting IE is transmitted with only an R_CID and power boosting value, it is difficult for an MS to determine if decoding information (i.e., a power boosting value) corresponds to any persistent resource. Thus, in order to distinguish this, the BS transmits ACID information of a corresponding persistent resource. That is, the MS can distinguish if the decoding information (e.g., the power boosting value) corresponds to any persistent resource, using the ACID.

More particularly, when allocating persistent resources to an MS, a BS allocates several continuous ACIDs to the MS. Consider the example where the BS informs the MS of a start CID and an ACID count. Here, if the BS informs the MS of 'start ACID=3', 'ACID count=3', the MS can use 'ACID=3, 4, 5' for persistent allocation. Accordingly, an ACID included in a power boosting IE, i.e. any one of the 'ACID=3, 4, 5', causes no problem in the MS's identifying of persistent resources. However, it is desirable to inform a start ACID value. This is because, when allocating persistent resources, the BS informs the MS of the start ACID and ACID count.

Table 3 shows a number of R_CIDs (# of R_CID) but, alternately, may not show the number of R_CIDs (# of R_CID). In this case, a power boosting IE may be constructed as in Table 4 below.

TABLE 4

| Syntax | Size | Notes |
| --- | --- | --- |
| Power boosting IE{ | | |
| Extended-2 DIUC | 4 | |
| Length | 8 | |
| R_CID Type | 2 | 0b00: Normal CID |
| | | 0b01: RCID11 |
| | | 0b10: RCID7 |
| | | 0b11: RCID3 |
| While (data_remaining) { | | |
| R_CID | Variable | |
| A_CID | 4 | Start of ACID |
| boosting | 3 | 0b000: Normal (not boosting) |
| | | 0b001: +6 dB |
| | | 0b010: −6 dB |
| | | 0b011: +9 dB |
| | | 0b100: +3 dB |

TABLE 4-continued

| Syntax | Size | Notes |
| --- | --- | --- |
| | | 0b101: −3 dB |
| | | 0b110: −9 dB |
| | | 0b111: −12 dB |
| } | | |
| } | | |

Although Table 4 does not include a field of '# of R_CID', it can decode the power boosting IE using a length field. That is, Table 4 can omit an overhead of the # of R_CID field using a logic such as 'while (data_remaining)'. This method is equally applicable to Tables 1 and 2 as well.

The above description is made on the assumption that, if two or more persistent resources are allocated to one MS, and power boosting information that is decoding information of the persistent resources is changed and a power boosting IE is transmitted, for example, an ACID is used to distinguish if the power boosting information of any persistent resource is transmitted.

In another exemplary implementation, a method using a persistent region ID is also possible. The persistent region ID is an ID for identifying HARQ regions, if there are HARQ regions for two or more persistent allocations in one frame.

In more detail, when a BS initially allocates persistent resources to an MS, the BS allocates persistent resources within a HARQ region that is mapped to a persistent region ID on a point-to-point basis. The MS stores the persistent region ID and then, upon receiving resource release, resource change, and persistent resource decoding change information, uses the persistent region ID. If only one persistent allocation to a specific MS in a HARQ region for one persistent allocation is possible, despite the MS being informed of the persistent region ID in place of the ACID, the MS can distinguish if the power boosting information transmitted through the power boosting IE corresponds to any persistent resource among two or more allocated persistent resources. This is because the HARQ region for persistent resources has an inherent persistent region ID.

Table 5 shows another example of a power boosting IE including the persistent region ID.

TABLE 5

| Syntax | Size | Notes |
| --- | --- | --- |
| Power boosting IE{ | | |
| Extended-2 DIUC | 4 | |
| Length | 8 | |
| R_CID Type | 2 | 0b00: Normal CID |
| | | 0b01: RCID11 |
| | | 0b10: RCID7 |
| | | 0b11: RCID3 |
| # of R_CID | 4 | |
| For (i=1; i <= # of R_CID; i++){ | | |
| R_CID | Variable | |
| Persistent region ID | 4 | |
| Power boosting field | 3 | 0b000: Normal (not boosting) |
| | | 0b001: +6 dB |
| | | 0b010: −6 dB |
| | | 0b011: +9 dB |
| | | 0b100: +3 dB |
| | | 0b101: −3 dB |
| | | 0b110: −9 dB |
| | | 0b111: −12 dB |
| } | | |
| } | | |

As shown in Table 5, the power boosting IE can include a persistent region ID for persistent resource identification. The assumption is that a BS allocates two different persistent resources to an MS. In this case, the BS allocates a persistent resource one by one to each of the HARQ regions having different persistent region IDs. If the power boosting IE includes only an R_CID and a power boosting value, the MS cannot distinguish if the power boosting value corresponds to any persistent resource. Thus, in an exemplary embodiment of the present invention, the persistent region ID for identifying the persistent resources is included in the power boosting IE. That is, the MS can determine if a corresponding power boosting value is equal to decoding information of any persistent resource using the persistent region ID within the power boosting IE.

Table 5 shows a number of R_CIDs (# of R_CID) included in the power boosting IE but, alternately, may not show the number of R_CIDs (# of R_CID). In this case, the power boosting IE can be constructed as in Table 6 below.

TABLE 6

| Syntax | Size | Notes |
| --- | --- | --- |
| Power boosting IE{ | | |
| Extended-2 DIUC | 4 | |
| Length | 8 | |
| R_CID Type | 2 | 0b00: Normal CID |
| | | 0b01: RCID11 |
| | | 0b10: RCID7 |
| | | 0b11: RCID3 |
| While (data_remaining) { | 4 | |
| R_CID | Variable | |
| Persistent region ID | 4 | Start ACID |
| Power boosting field | 3 | 0b000: Normal (not boosting) |
| | | 0b001: +6 dB |
| | | 0b010: −6 dB |
| | | 0b011: +9 dB |
| | | 0b100: +3 dB |
| | | 0b101: −3 dB |
| | | 0b110: −9 dB |
| | | 0b111: −12 dB |
| } | | |
| } | | |
| } | | |

Although Table 6 does not include a field of # of R_CID, it can decode a power boosting IE using a length field. That is, Table 6 can omit an overhead of the # of R_CID field using a logic such as 'while (data_remaining)'.

As described above, in order to use a subID, a BS has to inform an MS of the subID when transmitting signaling associated with an initial persistent allocation. For instance, the BS can inform a subID through a persistent allocation IE as shown in Table 7.

TABLE 7

| Syntax | Description |
| --- | --- |
| Persistent allocation IE{ | |
| UID | ex) CID or MACID |
| Reduced ID | ex) subID |
| ACID | HARQ Channel ID |
| Persistent region ID | |
| ..... | |
| MCS level | |
| Allocation resource | ex) slot offset + duration, resource index |
| Period | Allocation period |
| Start frame | Start frame at which persistent allocation begins |
| } | |

Table 7 shows that a persistent allocation IE includes only information on one user, but the persistent allocation IE can include information on a plurality of users.

If a user is identified by a position of a bitmap in a subsequent signaling, a reduced ID within the persistent allocation IE can represent the position of the bitmap. For example, if the reduced ID is expressed by 4 bits and 16 users are identified through the reduced ID, a user having a reduced ID of '0010' can determine if a user's own information is received by identifying a second position of a bitmap in a subsequent signaling.

Next, a description of recording a bitmap for user identification in a power boosting IE is made below.

The bitmap can be constructed using the aforementioned subID and, in another exemplary implementation, can be constructed using an index of a control channel (i.e., CQICH, ACKCH, etc.)

Figure 3:
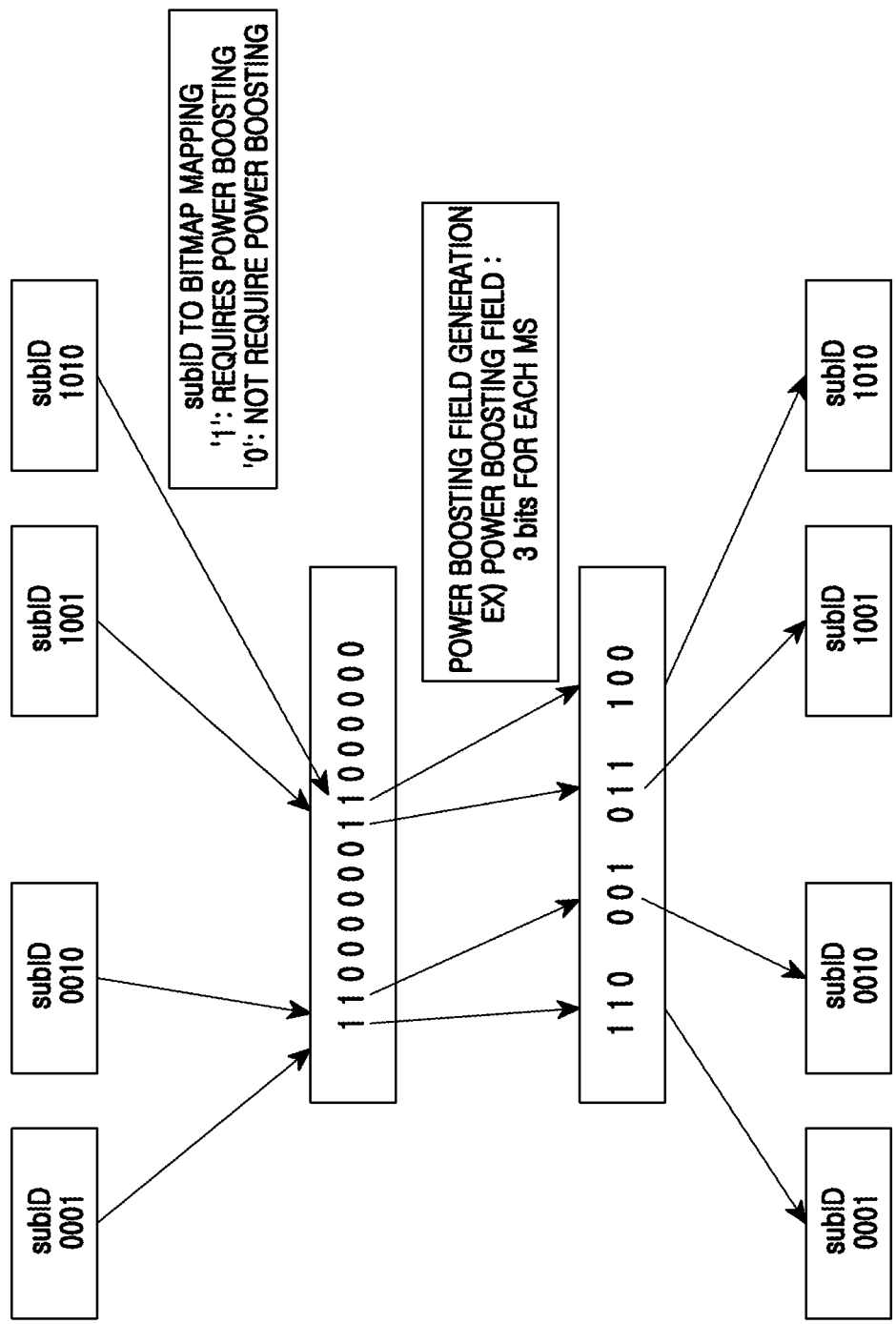
FIG. 3 is a diagram illustrating a construction of a bitmap using a sub-IDentifier (subID) according to an exemplary embodiment of the present invention.

FIG. 3 is a diagram illustrating a construction of a bitmap using a subID according to an exemplary embodiment of the present invention.

As illustrated in FIG. 3, the assumption is that a subID is constructed using 4 bits. In this case, a number of users identifiable by the subID is equal to 16. Thus, a length of the bitmap can be equal to 16 bits. At this time, a user having a subID of '0001' is mapped to a first position of the bitmap, and a user having a subID of '0010' is mapped to a second position of the bitmap. Similarly, a user having a subID of '1001' is mapped to a ninth position of the bitmap, and a user having a subID of '1010' is mapped to a tenth position of the bitmap.

If there is a change of decoding information (i.e., a power boosting value) of resources (i.e., bursts) that are allocated by persistent allocation, a BS determines MSs to which the changed power boosting value is to be transmitted, sets positions of the bitmap corresponding to the determined MSs to '1', and sets remaining positions to '0'. After that, the BS gathers the power boosting values of the MSs corresponding to the positions of the bitmap set to '1' and constructs a bit stream.

For example, as illustrated in FIG. 3, when power boosting values for respective subIDs '0001', '0010', '1001', and '1010' are equal to '110', '001', '011', and '100', the BS can construct a power boosting bit stream as "110001011100". Then, the BS transmits a power boosting IE that includes the bitmap and the power boosting bit stream to MSs, which are allocated persistent resources, through a MAP message of a frame in which a persistent allocation burst is transmitted.

Upon receiving the power boosting IE, the MSs identify a bitmap (1100000011000000) for user identification and determine if a corresponding power boosting IE includes its own power boosting value. That is, the MS determines if a position of a bitmap corresponding to its own subID is set to '1'. If the position of the bitmap corresponding to its own subID is set to '1', the MS determines if the '1' is equal to an $N^{th}$ time and identifies a power boosting value corresponding to its own sequence among the power boosting bit stream. In FIG. 3, the assumption is that 3 bits are used for the power boosting value.

Figure 4:
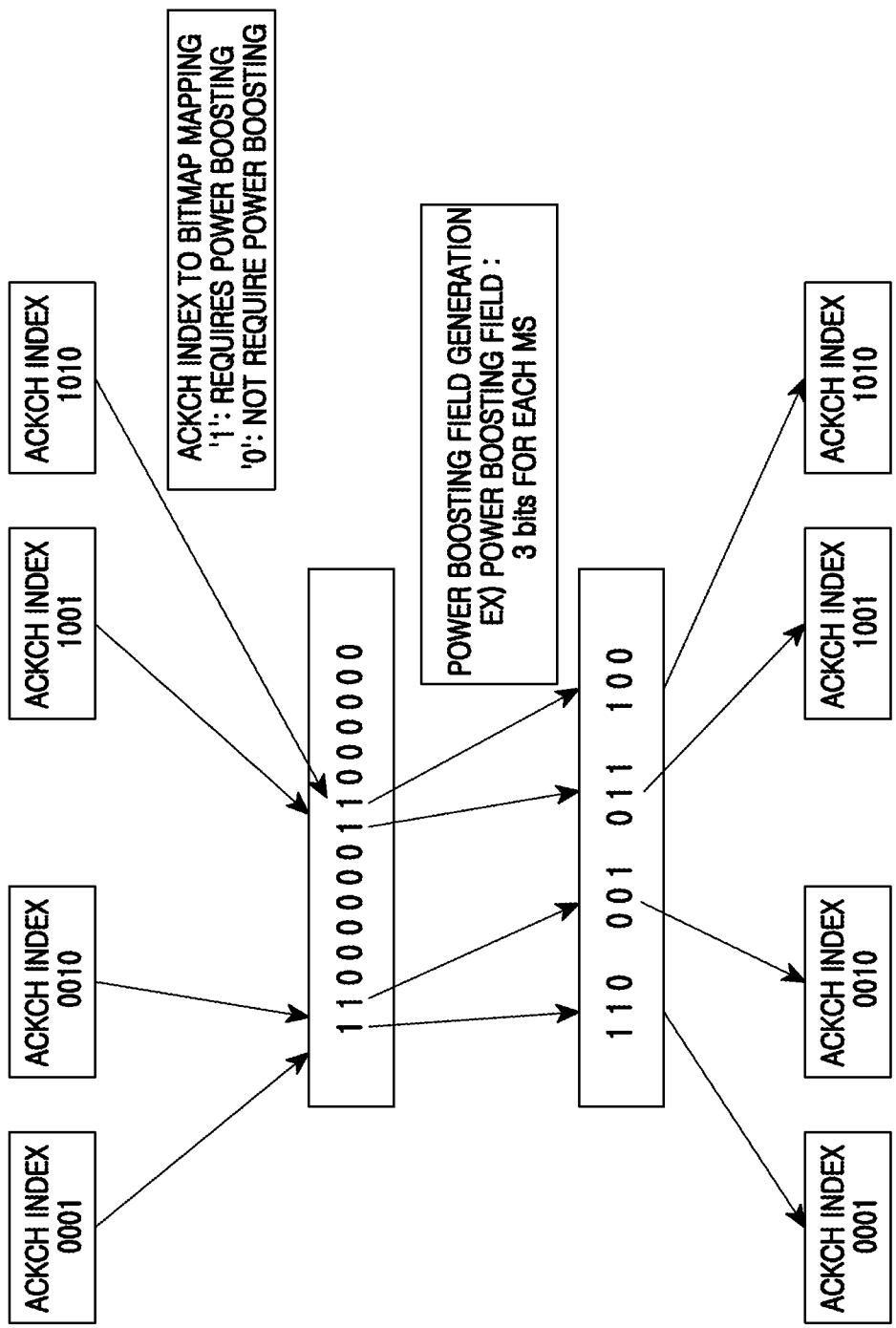
FIG. 4 is a diagram illustrating a construction of a bitmap using an index of an ACKnowledgement CHannel (ACKCH) according to an exemplary embodiment of the present invention.

FIG. 4 is a diagram illustrating a construction of a bitmap using an index of an ACKCH according to an exemplary embodiment of the present invention.

Regarding FIG. 4, the assumption is that a dedicated control channel is allocated to MSs allocated persistent resources. In addition, the assumption is that the allocation of the dedicated control channel uses an index. The dedicated control channel can be, for example, an ACKCH, a CQICH, etc. The ACKCH is a channel used for an MS to feed back information on reception or non-reception of a corresponding burst to a BS. The CQICH is a channel used for an MS to feed back a Channel Quality Indicator (CQI) by periods.

As illustrated in FIG. 4, a bitmap may be constructed using 16 bits, assuming that an index of an ACKCH is equal to 4 bits. A method of constructing a bitmap and a method of constructing a power boosting bit stream are substantially similar as the methods described with reference to FIG. 3 and thus, a detailed description thereof is omitted herein.

Figure 5:
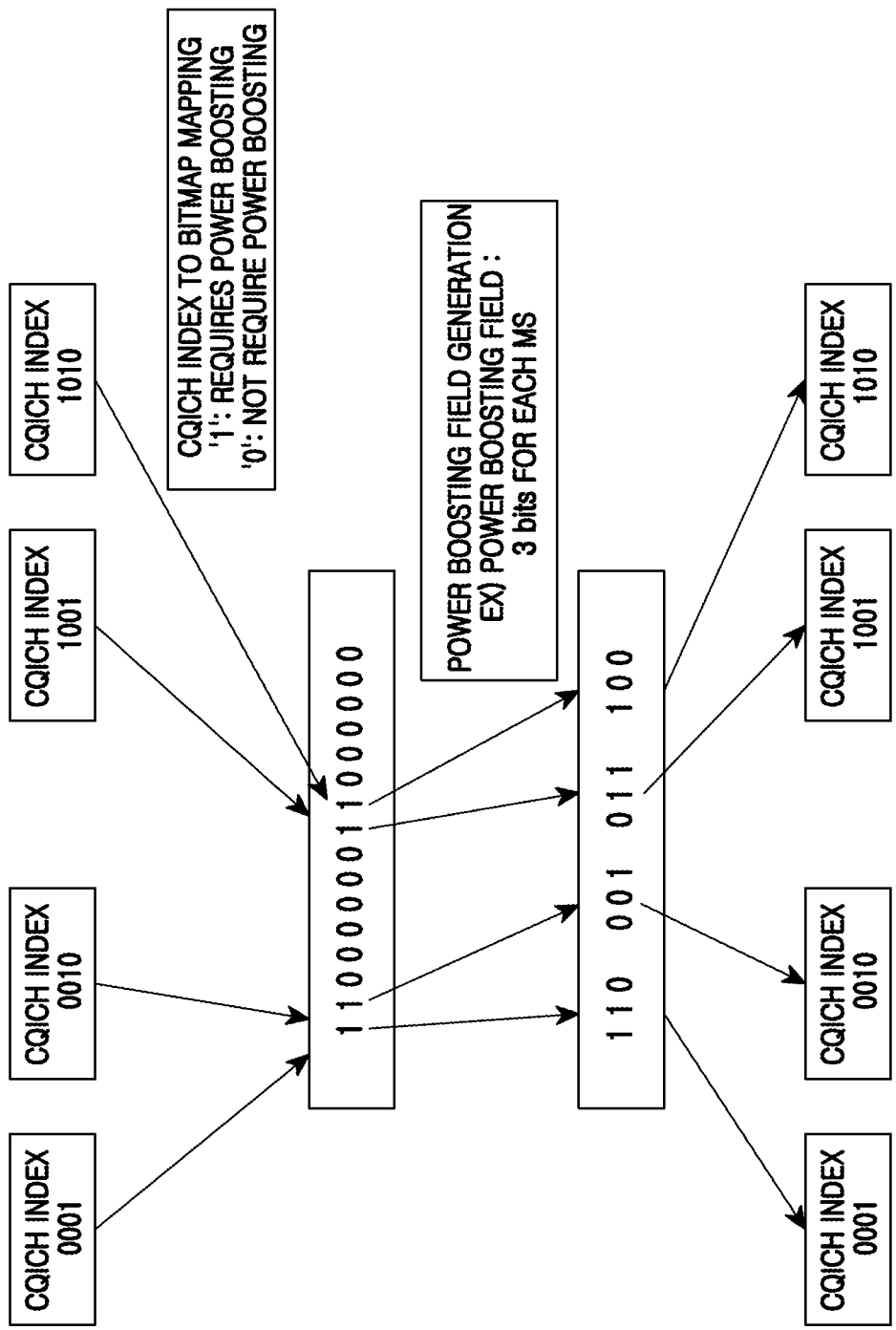
FIG. 5 is a diagram illustrating a construction of a bitmap using an index of a Channel Quality Indicator CHannel (CQICH) according to an exemplary embodiment of the present invention.

FIG. 5 is a diagram illustrating that a construction of a bitmap using an index of a CQICH according to an exemplary embodiment of the present invention.

As illustrated in FIG. 5, a bitmap is constructed using 16 bits, assuming that an index of a CQICH is equal to 4 bits. A method of constructing a bitmap and a method of constructing a power boosting bit stream are substantially similar to the methods described with reference to FIG. 3 and thus, a detailed description thereof is omitted herein.

Table 8 below shows another example of a power boosting IE including a bitmap for user identification.

TABLE 8

| Syntax | Size(bit) | Notes |
|---|---|---|
| Power boosting IE{ | | |
| Extended 2 DIUC | 4 | |
| Length | 8 | |
| Bitmap for user identification | | |
| Bit length for each power boosting | | |
| Bitmap for power boosting | | |
| } | | |

In Table 8, as described above, a bitmap for user identification is constructed using a subID, an ACKCH index, a CQICH index, etc. A bitmap for power boosting is constructed by gathering power boosting values of MSs that are set to '1' in the bitmap for user identification. If there is no knowledge of a length of the bitmap, a length of a corresponding field may additionally need to be set. A bit length field (i.e., a bit length for each power boosting) informs the MS of a bit count used for the power boosting value. In an exemplary embodiment of the present invention, an example in which 3 bits are used for the power boosting value is described. A length of the bitmap recording the power boosting value (i.e., the bitmap for power boosting) can be determined depending on a number of positions set to '1' in the bitmap for user identification and a bit count used for the power boosting value. For example, if the number of positions set to '1' is equal to '5' and the power boosting value is expressed by 3 bits, the length of the bitmap for power boosting may be determined to be 15 bits.

Figure 6:
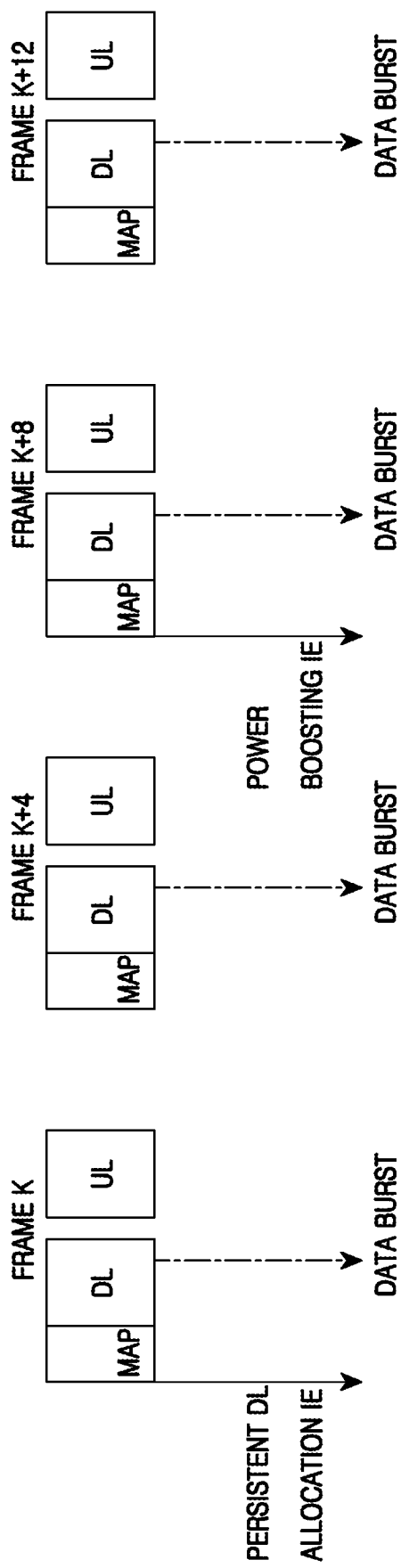
FIG. 6 is a diagram illustrating an example of a transmission of a power boosting Information Element (IE) according to an exemplary embodiment of the present invention.

FIG. 6 is a diagram illustrating an example of transmission of a power boosting IE according to an exemplary embodiment of the present invention.

As illustrated in FIG. 6, a BS transmits a persistent allocation IE at a frame (k), and allocates persistent resources to at least one MS. After that, the BS transmits a DL burst to the MS through the persistent resources by periods (e.g., at a 4-frame period) according to the persistent allocation IE.

Meanwhile, the BS determines if there is a change of decoding information (e.g., a power boosting value) for persistent allocated resources (or bursts). If there is the change of the decoding information, the BS determines to which MSs the changed decoding information is to be transmitted, and constructs a power boosting IE to be transmitted to the MSs. The BS transmits the power boosting IE to the MSs at a frame (i.e., a frame (k+8)) at which a corresponding burst (i.e., a burst having the change of the decoding information) is transmitted.

Meanwhile, the MS determines if the received power boosting IE includes a power boosting value for it and, if there is a power boosting value for the MS, the MS decodes a corresponding burst using the changed power boosting value.

Based on the above description, an exemplary embodiment of the present invention is described below.

Figure 7:
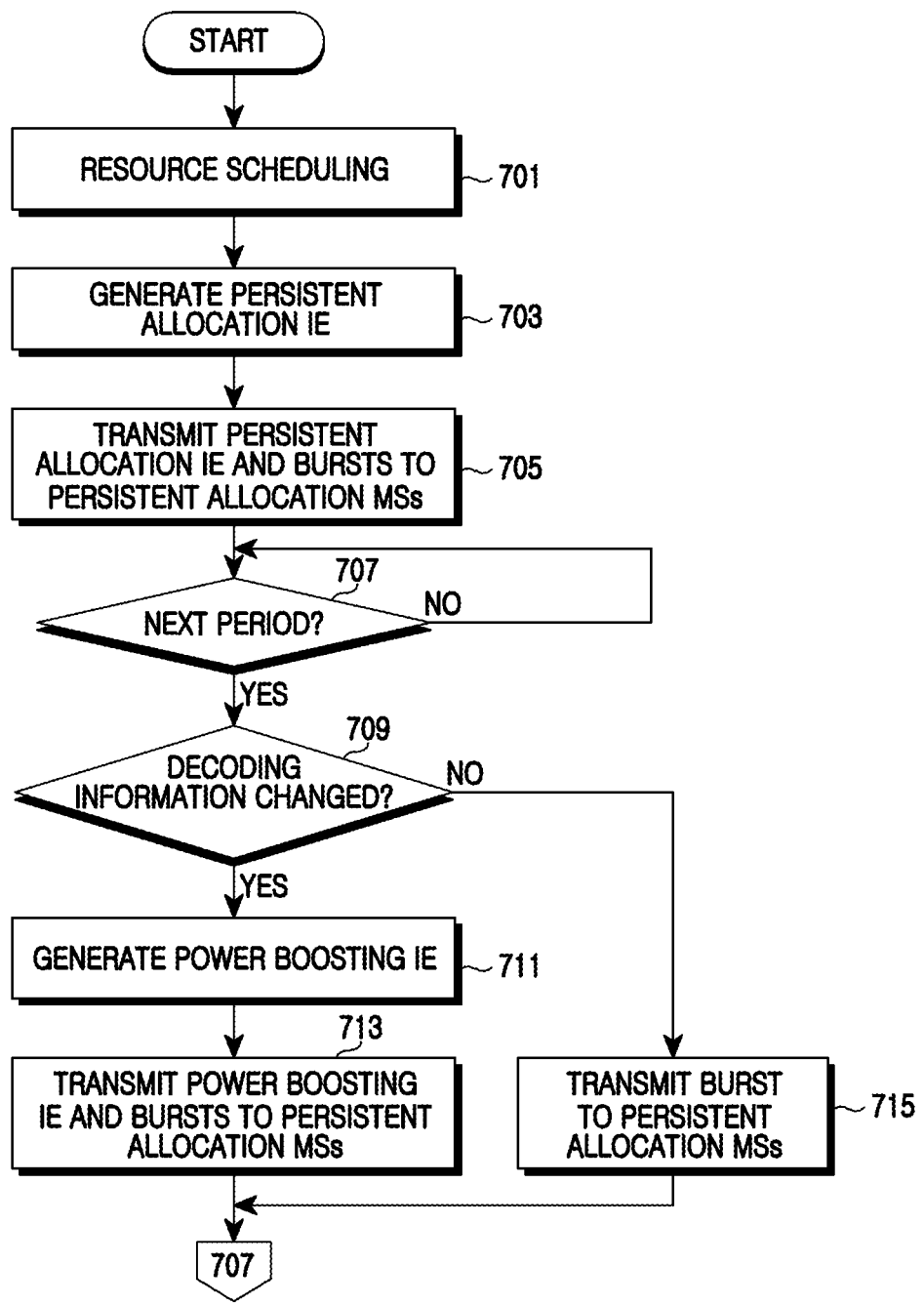
FIG. 7 is a flowchart illustrating an operation process of a Base Station (BS) according to an exemplary embodiment of the present invention.

FIG. 7 is a flow diagram illustrating an operation process of a BS according to an exemplary embodiment of the present invention.

Referring to FIG. 7, in step 701, the BS performs resource scheduling. After performing the resource scheduling, in step 703, the BS determines if there is a need to transmit a persistent allocation IE and, if there is the need, generates the persistent allocation IE. As shown in Table 7, the persistent allocation IE can include a UID, a reduced ID to be used for subsequent signaling, an MCS level, a position and size of an allocated resource, an allocation period, information for HARQ operation (e.g., an ACID), an ID for HARQ region identification (i.e., a persistent region ID), information on a start frame at which persistent allocation starts, etc. The reduced ID can be a subID (e.g., 4 bits) having a short length compared to the UID. The subID can represent a corresponding position of a bitmap for user identification that is used for subsequent signaling. The persistent allocation IE can include information on at least one user.

In step 705, the BS transmits the generated persistent allocation IE and bursts corresponding to the persistent allocation IE to persistent allocation MSs. The persistent allocation IE can be transmitted through a MAP message. The persistent allocation bursts are transmitted through a data burst region.

In step 707, the BS determines if it is a next period according to the allocation period. The persistent allocation is a resource allocation scheme for a service for generating a packet by periods. If the allocation period is equal to 4 frames, the BS can transmit a burst at a frame (k), a frame (k+4), a frame (k+8), and a frame (k+12).

If it is the next period, in step 709, the BS determines if there is a change of decoding information of persistent allocation bursts transmitted at a present frame. Here, the assumption is that the decoding information is power boosting information. If there is a change of power boosting information in at least one of the persistent allocation bursts, the BS goes to step 711 and, otherwise, goes to step 715.

In step 711, the BS determines which MSs have a change of decoding information, gathers the decoding information of the MSs, and generates a power boosting IE. As shown in Tables 1 to 6, the power boosting IE can include UIDs having a change of decoding information (e.g., CIDs, R_CIDs, and Media Access Control IDentifiers (MACIDs)), an ACID, a persistent region ID, a power boosting value corresponding to each of the UIDs, etc. In particular, if several persistent resources are allocated to one MS, the UID is not enough to distinguish if corresponding decoding information corresponds to any one of several persistent resources and thus, in addition to the UID, either the ACID or the persistent region ID is included in the power boosting IE. For another example, as shown in Table 8, the power boosting IE can include a bitmap for power boosting that is constructed in connection with a bitmap for user identification and corresponding power boosting values. The bitmap for user identification can be constructed using a subID allocated to each persistent allocation MS, an index of a dedicated control channel (i.e., a CQICH and an ACKCH) allocated to each persistent allocation MS, etc. In more detail, an MS recognizes a position of a bitmap allocated to itself using a previously allocated subID or an index of a previously allocated dedicated control channel. If the position of the bitmap is set to '1', the MS decodes the bitmap for power boosting and acquires changed decoding information.

In step 713, the BS transmits the generated power boosting IE and persistent allocation bursts to the persistent allocation MSs, and returns to step 707 to wait for a next period. The power boosting IE can be transmitted through a MAP message. The persistent allocation bursts are transmitted through a data burst region.

If there is no MS that has a change of decoding information in step 709, the BS transmits corresponding bursts to the persistent allocation MSs in step 715. Then, the BS returns to step 707 to wait for a next period.

Figure 8:
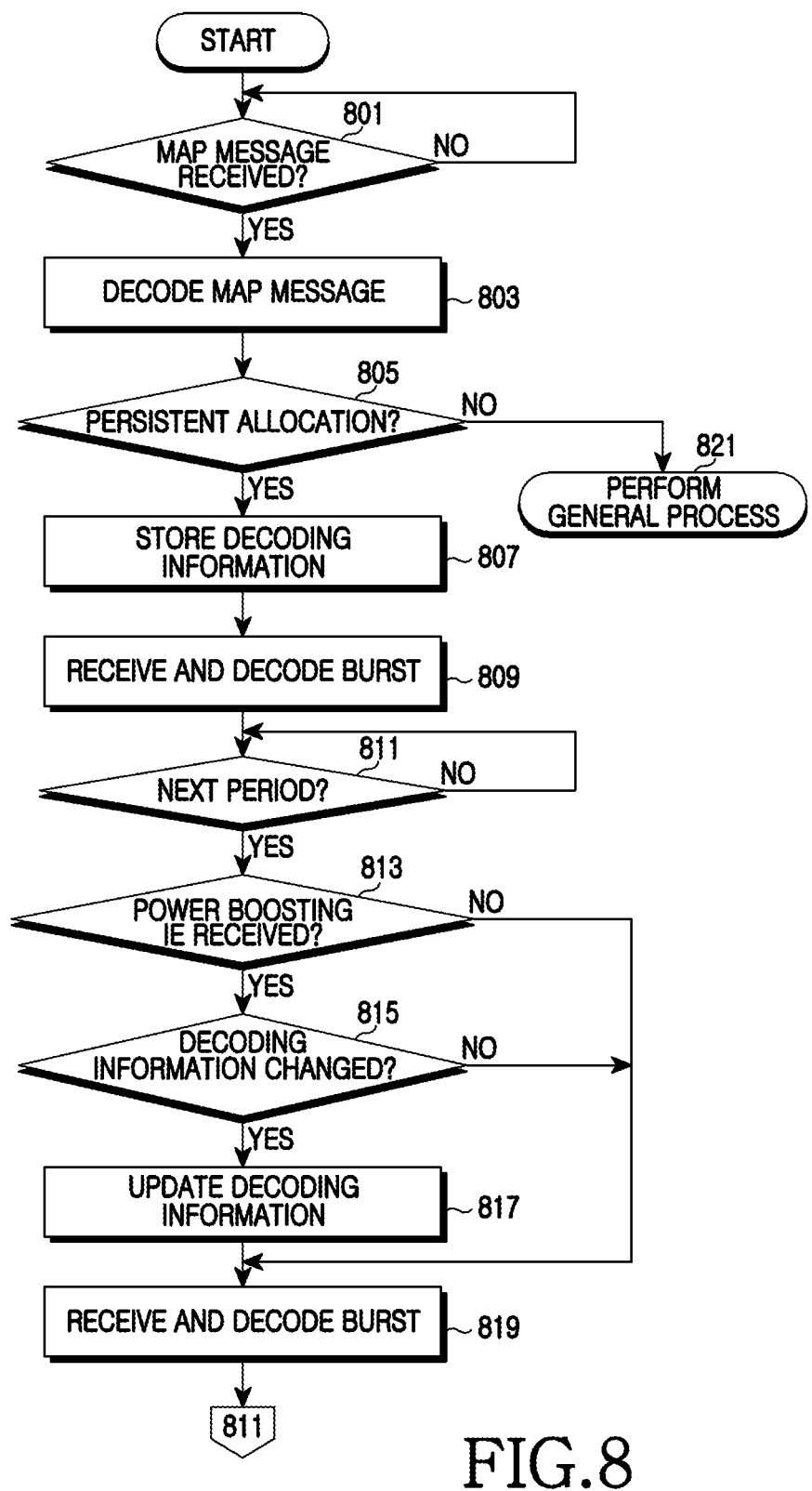
FIG. 8 is a flowchart illustrating an operation process of a Mobile Station (MS) according to an exemplary embodiment of the present invention.

FIG. 8 is a flow diagram illustrating an operation process of an MS according to an exemplary embodiment of the present invention.

Referring to FIG. 8, in step 801, the MS determines if a MAP message is received. If the MAP message is received, in step 803, the MS decodes the received MAP message, thereby identifying a DL and UL resource allocation state. That is, the MS recognizes its own allocated resources by decoding the MAP message.

In step 805, the MS determines if persistent allocation related information is transmitted to itself based on the decoding of the MAP message. That is, the MS determines if there is a persistent allocation IE within the MAP message, and determines if its own UID is included within the persistent allocation IE.

If the persistent allocation related information is not received, in step 821, the MS performs a general process. If the persistent allocation related information is received, in step 807, the MS extracts decoding information from the persistent allocation IE and stores the extracted decoding information.

As shown in Table 7, the persistent allocation IE can include a UID, a reduced ID to be used for subsequent signaling, an MCS level, HARQ operation information (e.g., an ACID), a persistent region ID for HARQ region identification, a position and size of an allocated resource, an allocation period, information on a start frame at which persistent allocation starts, etc. The reduced ID can be a subID (e.g., 4 bits) having a short length compared to the UID. The subID can represent a corresponding position of a bitmap for user identification that is used for subsequent signaling. The persistent allocation IE can include information on at least one user.

Then, in step 809, the MS decodes a corresponding persistent allocation burst, which is received at a present frame, using the decoding information. In step 811, the MS determines if it is a next period according to the allocation period.

If it is the next period, in step 813, the MS decodes a MAP message received at a present frame and identifies if a power boosting IE is included within the MAP message. If the power boosting IE is not received, in step 819, the MS decodes a corresponding persistent allocation burst received at a present frame, using the stored decoding information. Then, the MS returns to step 811 to wait for a next period.

If the power boosting IE is received, in step 815, the MS determines if its corresponding power boosting information is included within the power boosting IE. That is, the MS determines if there is a change of the power boosting information. In more detail, the MS identifies if its own UID is located within the power boosting IE. If its own UID is located within the power boosting IE, the MS determines if the power boosting information corresponds to any persistent resource, through an ACID or a persistent region ID.

If the corresponding power boosting information is not included within the power boosting IE, in step 819, the MS decodes a corresponding persistent allocation burst, which is received at a present frame, using the stored decoding information, and returns to step 811 to wait for a next period.

As shown in Tables 1 to 6, the power boosting IE can include UIDs having a change of decoding information (e.g., CIDs, R_CIDs, and MACIDs), an ACID, a persistent region ID, a power boosting value corresponding to each of the UIDs, etc. In another example, as shown in Table 8, the power boosting IE can include a bitmap for power boosting that is constructed in connection with a bitmap for user identification and corresponding power boosting values. The bitmap for user identification can be constructed using a subID allocated to each persistent allocation MS, an index of a dedicated control channel (i.e., a CQICH and an ACKCH) allocated to each persistent allocation MS, etc. That is, an MS recognizes a position of a bitmap allocated to itself using a previously allocated subID or an index of a previously allocated dedicated control channel. If the position of the bitmap is set to '1', the MS decodes the bitmap for power boosting and acquires changed decoding information.

Thus, if the corresponding power boosting information is included within the power boosting IE, in step 817, the MS extracts a changed power boosting value from the power boosting IE and updates currently stored decoding information using the extracted power boosting value. Then, in step 819, the MS decodes a corresponding persistent allocation burst, which is received at a present frame, using the updated decoding information. Then, the MS returns to step 811 to wait for a next period.

Figure 9:
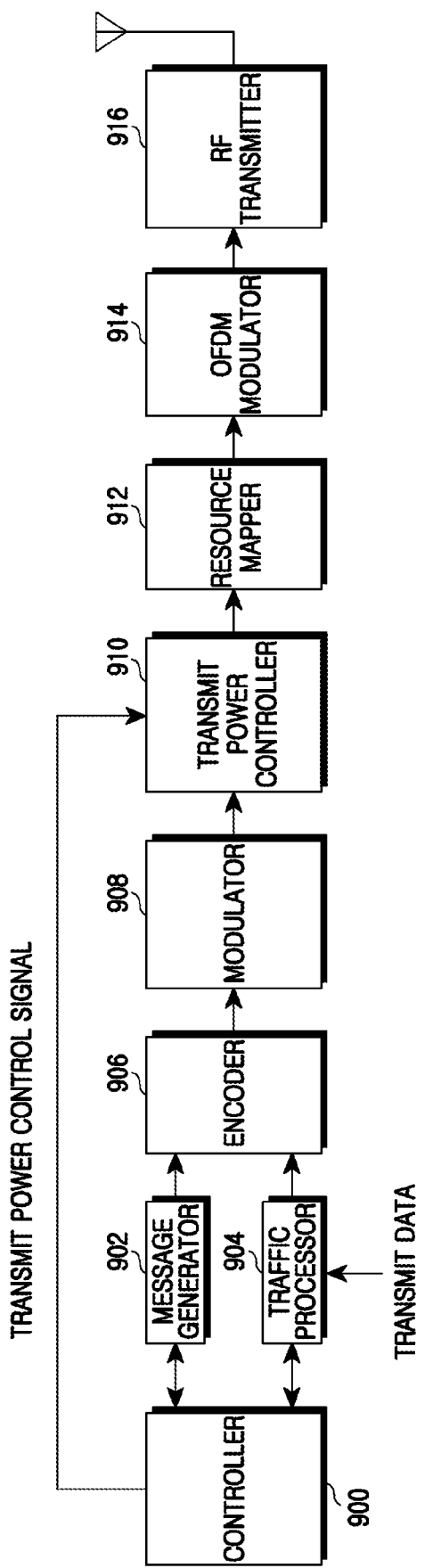
FIG. 9 is a block diagram illustrating a construction of a BS according to an exemplary embodiment of the present invention.

FIG. 9 is a block diagram illustrating a construction of a BS according to an exemplary embodiment of the present invention.

As illustrated in FIG. 9, the BS includes a controller 900, a message generator 902, a traffic processor 904, an encoder 906, a modulator 908, a transmit power controller 910, a resource mapper 912, an OFDM modulator 914, and an RF transmitter 916. FIG. 9, for convenience of description, is limited to the flow of signals toward the transmitter and only illustrates a control line used for power boosting.

Referring to FIG. 9, the controller 900 performs resource scheduling every frame, and controls corresponding constituent elements according to the scheduling result. More particularly, according to an exemplary embodiment of the present invention, the controller 900 controls a general operation according to persistent allocation. That is, the controller 900 controls the generation and transmission of each type of signaling (i.e., a persistent allocation IE, a power boosting IE, etc.) associated with the persistent allocation, and controls burst transmission/reception according to the persistent allocation. In addition, the controller 900 provides a control signal for controlling a transmit power of each burst to the transmit power controller 910.

The message generator 902 generates each type of signaling messages under the control of the controller 900. According to an exemplary embodiment of the present invention, the message generator 902 generates a persistent allocation IE and a power boosting IE.

As shown in Table 7, the persistent allocation IE can include a UID, a reduced ID to be used for subsequent signaling, an MCS level, a position and size of an allocated resource, an allocation period, information for HARQ operation (e.g., an ACID), a persistent region ID, information on a start frame at which persistent allocation starts, etc. The reduced ID can be a subID (e.g., 4 bits) having a short length compared to the UID. The subID can represent a corresponding position of a bitmap for user identification that is used for subsequent signaling. The persistent allocation IE can include information on at least one user.

As shown in Tables 1 to 6, the power boosting IE can include UIDs having a change of decoding information (e.g., CIDs, R_CIDs, and MACIDs), an ACID, a persistent region ID, a power boosting value corresponding to each of the UIDs, etc. In another example, as shown in Table 8, the power boosting IE can include a bitmap for power boosting that is constructed in connection with a bitmap for user identification and power boosting values. The bitmap for user identification can be constructed using a subID allocated to each persistent allocation MS, an index of a dedicated control channel (i.e., a CQICH and an ACKCH) allocated to each persistent allocation MS, etc.

The traffic processor 904 constructs transmit data by a data burst according to a protocol and forwards the transmit data to the encoder 906.

The encoder 906 of a physical layer encodes a signaling message from the message generator 902 and a data burst from the traffic processor 906 according to an MCS level. The encoder 906 can use a Convolutional Code (CC), a Turbo Code (TC), a Convolutional Turbo Code (CTC), a Low Density Parity Check (LDPC) code, etc. The modulator 908 modulates an encoded packet from the encoder 906 according to an MCS level and generates modulated symbols. For example, the modulator 908 can use QPSK, 16QAM, 64QAM, etc.

The transmit power controller 910 controls a transmit power (or power booting) of a burst from the modulator 908 under the control of the controller 900.

The resource mapper 912 maps data from the transmit power controller 910 to predefined resources (or subcarriers). According to an exemplary embodiment of the present invention, the resource mapper 912 maps a burst transmitted to a persistent allocation MS to persistent resources, every transmission on the basis of a period of the persistent allocation.

The OFDM modulator 914 OFDM-modulates the resource-mapped data from the resource mapper 912 and generates an OFDM symbol. The OFDM modulation means an inclusion of Inverse Fast Fourier Transform (IFFT) operation, Cyclic Prefix (CP) insertion, etc. The RF transmitter 916 converts sample data from the OFDM modulator 914 into an analog signal, converts the analog signal into an RF band signal, and transmits the RF band signal through an antenna.

The persistent allocation IE is transmitted once at a first frame at which persistent allocation starts. The power boosting IE can be transmitted at a corresponding frame whenever there is a change of decoding information for persistent allocation.

Figure 10:
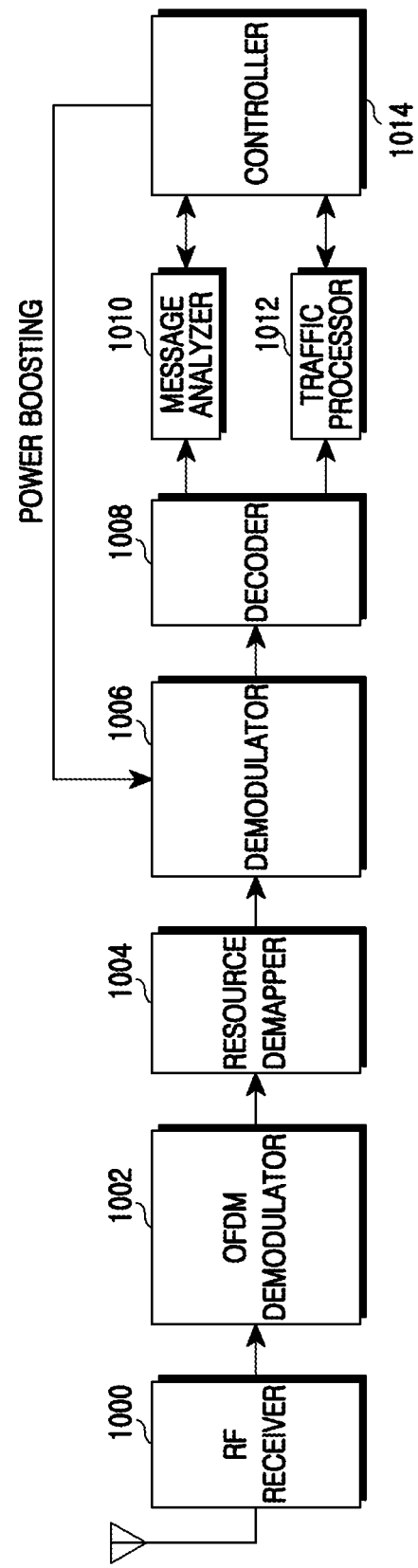
FIG. 10 is a block diagram illustrating a construction of an MS according to an exemplary embodiment of the present invention.

FIG. 10 is a block diagram illustrating a construction of an MS according to an exemplary embodiment of the present invention.

As illustrated in FIG. 10, the MS includes an RF receiver 1000, an OFDM demodulator 1002, a resource demapper 1004, a demodulator 1006, a decoder 1008, a message analyzer 1010, a traffic processor 1012, and a controller 1014. FIG. 10, for convenience of description, is limited to the flow of signals from the receiver and only illustrates a control line used for power boosting.

Referring to FIG. 10, the RF receiver 1000 converts an RF band signal received through an antenna into a baseband signal, and converts the baseband signal into digital sample data. The OFDM demodulator 1002 OFDM-demodulates the sample data from the RF receiver 1000 and outputs frequency domain data. OFDM demodulation includes CP removal, a Fast Fourier Transform (FFT) operation, etc.

The resource demapper 1004 extracts data to be demodulated from the frequency domain data from the OFDM demodulator 1002. According to an exemplary embodiment of the present invention, the resource demapper 1004 extracts a burst received through a persistent allocation resource, during reception based on a period of persistent allocation.

The demodulator 1006 demodulates the burst from the resource demapper 1004. The demodulator 1006 demodulates data with reference to a power boosting value of a corresponding burst from the controller 1014. That is, the demodulator 1006 detects a signal point of a received modulated symbol with reference to the power boosting value.

The decoder 1008 decodes the demodulated data from the demodulator 1006. If a demodulated packet is a signaling message, the signaling message is provided to the message analyzer 1010 and, if the demodulated packet is traffic, the packet is provided to the traffic processor 1012.

The message analyzer 1010 analyzes a received signaling message and provides the result to the controller 1014. According to an exemplary embodiment of the present invention, the message analyzer 1010 determines if there is a persistent allocation IE within a received MAP message and, if there is the persistent allocation IE, determines if persistent allocation resources are allocated to the MS. If the persistent allocation resources are allocated, the message analyzer 1010 extracts decoding information (e.g., an MCS level, a resource position and size, an allocation period, information for HARQ operation (i.e., an ACID), a persistent region ID, a start frame, etc.) from the persistent allocation IE and provides the extracted decoding information to the controller 1014. In addition, the message analyzer 1010 determines if there is a power boosting IE within the received MAP message and, if there is the power boosting IE, determines if changed decoding information for the MS is included within the power boosting IE. If the changed decoding information is included, the message analyzer 1010 extracts the changed decoding information (e.g., a power boosting value) from the power boosting IE and provides the extracted changed decoding information to the controller 1014.

The traffic processor 1012 processes traffic from the decoder 1008 according to a corresponding protocol.

The controller 1014 controls a general operation of the MS. According to an exemplary embodiment of the present invention, if a persistent allocation IE allocating persistent resources to the MS is received, the controller 1014 controls persistent allocation related transmission/reception depending on information on the persistent allocation IE. If a power boosting IE including a changed power boosting value for a persistent allocation burst is received, the controller 1014 provides the changed power boosting value to the demodulator 1006 for use in data demodulation.

In an exemplary embodiment of the present invention, a DL persistent allocation is described as an example, but the present invention is equally applicable to a UL persistent allocation as well. That is, a BS can allocate UL persistent resources to an MS by persistent allocation and, if it is determined that there is a need for a change of decoding information (i.e., an MCS level, power boosting, etc.) for UL persistent resources because of a channel change, the BS can gather all of the information of MSs requiring a change and perform signaling as one message.

As described above, exemplary embodiments of the present invention can inform MSs, which are allocated resources by a persistent allocation scheme, of changed decoding information (e.g., power boosting information, an MCS level, etc.). In addition, exemplary embodiments of the present invention have an advantage of being able to reduce a signaling overhead associated with a persistent allocation.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operation method of a Base Station (BS) in a wireless communication system, the method comprising:
   determining if decoding information for one or more persistent allocations assigned to one or more corresponding Mobile Stations (MSs) is updated;
   if the decoding information is updated, generating a signaling message to signal the update of the decoding information; and
   transmitting the signaling message through a DownLink (DL) MAP,
   wherein the signaling message comprises a first bitmap for user identification and a second bitmap,
   wherein the first bitmap includes a plurality of bits whose positions correspond to the MSs and identifies at least one MS having at least one persistent allocation to which the updated decoding information is to be applied, and
   wherein the second bitmap comprises at least one power boosting value for the at least one persistent allocation.

2. The method of claim 1, wherein the second bitmap is included in a power boosting Information Element (IE).

3. The method of claim 1, wherein the transmitting of the signaling message comprises:
   encoding a DL MAP message comprising the signaling message;
   modulating the encoded DL MAP message;
   Orthogonal Frequency Division Multiplexing (OFDM)-modulating the modulated DL MAP message;
   generating time domain data;
   Radio Frequency (RF)-processing the time domain data; and
   transmitting the RF-processed time domain data.

4. The method of claim 1, further comprising:
   if the decoding information is updated, baseband-processing a corresponding DL burst based on the updated decoding information;
   RF-processing the baseband-processed DL burst; and
   transmitting the RF-processed baseband-processed DL burst to a corresponding MS.

5. The method of claim 1, wherein the positions of bits in the first bitmap correspond at least one of sub-Identifiers (subIDs), ACKnowledgement CHannel (ACKCH) identifiers and Channel Quality Indicator CHannel (CQICH) identifiers.

6. The method of claim 1, wherein the second bitmap comprises a power boosting value for only those at least one MSs identified as having at least one persistent allocation to which updated decoding information is to be applied.

7. An operation method of a Mobile Station (MS) in a wireless communication system, the method comprising:
   receiving a signaling message to signal an update of decoding information for one or more DownLink (DL) persistent allocations;
   determining if the updated decoding information for the MS is comprised within the signaling message; and
   if the updated decoding information is comprised within the signaling message, updating the decoding information for the one or more persistent allocations,
   wherein the signaling message comprises a first bitmap for user identification and a second bitmap,
   wherein the first bitmap includes a plurality of bits whose positions correspond to MSs and identifies at least one MS having at least one persistent allocation to which the updated decoding information is to be applied, and
   wherein the second bitmap comprises at least one power boosting value for the at least one persistent allocation.

8. The method of claim 7, wherein the second bitmap is included in a power boosting Information Element (IE).

9. The method of claim 7, further comprising processing a received DL burst on the basis of the updated decoding information.

10. The method of claim 7, wherein the signaling message comprises a length field informing a bit count used for the power boosting value.

11. The method of claim 7, wherein the positions of bits in the first bitmap correspond at least one of sub-Identifiers (subIDs), ACKnowledgement CHannel (ACKCH) identifiers and Channel Quality Indicator CHannel (CQICH) identifiers.

12. The method of claim 7, wherein the second bitmap comprises a power boosting value for only those at least one MSs identified as having at least one persistent allocation to which updated decoding information is to be applied.

13. A Base Station (BS) apparatus in a wireless communication system, the apparatus comprising:
   a controller for updating decoding information for one or more persistent allocations assigned to one or more corresponding Mobile Stations (MSs);
   a message generator for generating a signaling message to signal the update of the decoding information; and
   a transmitter for transmitting the signaling message through a DownLink (DL) MAP,
   wherein the signaling message comprises a first bitmap for user identification and a second bitmap,
   wherein the first bitmap includes a plurality of bits whose positions correspond to the MSs and identifies at least one MS having at least one persistent allocation to which the updated decoding information is to be applied, and
   wherein the second bitmap comprises at least one power boosting value for the at least one persistent allocation.

14. The apparatus of claim 13, wherein the second bitmap is included in a power boosting Information Element (IE).

15. The apparatus of claim 13, wherein the transmitter comprises:
   an encoder for encoding a DL MAP message comprising the signaling message;
   a modulator for modulating the encoded DL MAP message;
   an Orthogonal Frequency Division Multiplexing (OFDM) modulator for OFDM-modulating the modulated DL MAP message and for generating time domain data; and
   a Radio Frequency (RF) transmitter for RF-processing and transmitting the time domain data.

16. The apparatus of claim 13, further comprising:
   a baseband processor for, if the decoding information is updated, baseband-processing a DL burst for a corresponding persistent allocation on the basis of the updated decoding information; and
   an RF processor for RF-processing and transmitting the baseband-processed DL burst to a corresponding MS.

17. The apparatus of claim 13, wherein the signaling message comprises a length field informing a bit count used for the power boosting value.

18. The apparatus of claim 13, wherein the positions of bits in the first bitmap correspond at least one of sub-Identifiers (subIDs), ACKnowledgement CHannel (ACKCH) identifiers and Channel Quality Indicator CHannel (CQICH) identifiers.

19. The apparatus of claim 13, wherein the second bitmap comprises a power boosting value for only those at least one MSs identified as having at least one persistent allocation to which updated decoding information is to be applied.

20. A Mobile Station (MS) apparatus in a wireless communication system, the apparatus comprising:
- a receiver for receiving a signaling message to signal an update of decoding information for one or more DownLink (DL) persistent allocations;
- a message analyzer for determining if the updated decoding information for an MS is comprised within the signaling message, and for extracting the updated decoding information from the signaling message; and
- a controller for updating the decoding information for the one or more persistent allocations using the extracted updated decoding information,
- wherein the signaling message comprises a first bitmap for user identification and a second bitmap,
- wherein the first bitmap includes a plurality of bits whose positions correspond to MSs and identifies at least one MS having at least one persistent allocation to which the updated decoding information is to be applied, and
- wherein the second bitmap comprises at least one power boosting value for the at least one persistent allocation.

21. The apparatus of claim 20, wherein the second bitmap is included in a power boosting Information Element (IE).

22. The apparatus of claim 20, wherein the receiver processes a received DownLink (DL) burst on the basis of the updated decoding information.

23. The method of claim 1, wherein the signaling message comprises a length field informing a bit count used for the power boosting value.

24. The apparatus of claim 20, wherein the signaling message comprises a length field informing a bit count used for the power boosting value.

25. The apparatus of claim 20, wherein the positions of bits in the first bitmap correspond at least one of sub-Identifiers (subIDs), ACKnowledgement CHannel (ACKCH) identifiers and Channel Quality Indicator CHannel (CQICH) identifiers.

26. The apparatus of claim 20, wherein the second bitmap comprises a power boosting value for only those at least one MSs identified as having at least one persistent allocation to which updated decoding information is to be applied.

* * * * *